United States Patent [19]

Viscardi et al.

[11] Patent Number: 4,739,228
[45] Date of Patent: Apr. 19, 1988

[54] ELECTRIC CIRCUIT FOR S CORRECTION OF THE VERTICAL SCANNING RAMP IN A TELEVISION APPARATUS

[75] Inventors: Roberto Viscardi, Lissone; Silvano Coccetti, Vittuone; Silvano Gornati, Casorezzo, all of Italy

[73] Assignee: SGS Microelettronica S.p.A., Catania, Italy

[21] Appl. No.: 863,842

[22] Filed: May 16, 1986

[30] Foreign Application Priority Data

May 29, 1985 [IT] Italy ................. 20941 A/85

[51] Int. Cl.$^4$ ............ H01J 29/70; H01J 29/76; H01J 29/56; H04N 5/06
[52] U.S. Cl. ................. 315/408; 315/371; 315/403; 315/370; 358/150; 358/159; 328/185; 307/228
[58] Field of Search ............ 358/148, 150, 158, 159; 315/368, 370, 371, 381, 382, 379, 387, 388, 389, 393, 395, 397, 398, 399, 400, 403, 405, 407, 408, 410, 411; 328/185; 307/228, 261

[56] References Cited

U.S. PATENT DOCUMENTS

| 3,723,804 | 3/1973 | Yasumatsuya | 315/370 |
| 3,735,192 | 5/1973 | Avery | 315/388 |
| 3,863,106 | 1/1975 | Haferl | 315/388 |
| 4,365,270 | 12/1982 | Rutishauser | 358/140 |
| 4,533,855 | 8/1985 | Willis et al. | 315/370 |
| 4,645,987 | 2/1987 | Kiteley et al. | 315/389 |

FOREIGN PATENT DOCUMENTS 0157761 8/1978 Netherlands ............ 315/371

Primary Examiner—James J. Groody
Assistant Examiner—Michael D. Parker
Attorney, Agent, or Firm—Cushman, Darby & Cushman

[57] ABSTRACT

A variable-gain rectifier-amplifier with regulated voltage converts the output ramp of a ramp generator with regulating resistance of ramp amplitude into a triangular wave form with adjustable linearity which a feedback circuit brings back to said regulating resistance in the form of alternating current superimposing it on the direct current regulated through said resistance. This provides an S correction of the output ramp which depends on the gain regulation voltage of the rectifier-amplifier circuit.

6 Claims, 3 Drawing Sheets

4,739,228

ELECTRIC CIRCUIT FOR S CORRECTION OF THE VERTICAL SCANNING RAMP IN A TELEVISION APPARATUS

BACKGROUND OF THE INVENTION

The present invention relates to an electronic circuit for S correction of the vertical scanning line in a television apparatus.

As is known, image synthesis in television is produced with an electron beam of which is modulated by the video signal.

Scanning of the beam over the whole screen is obtained by a combination of magnetic fields produced by horizontal and vertical deflection coils arranged on the neck of the kinescope.

In the case of vertical deflection the magnetic field must be such that it produces deviations of the beam from the top of the screen toward the bottom thereof and then return rapidly to the starting point for the next frame period.

The current running through the vertical deflection coil in a frame period is approximately a saw-tooth function. Consideration that the television screen is generally flat rather than round so that the spaces covered by the electron beam are proportionate to the tangent of the scanning angle rather than to the angle itself, to hold scanning speed steady both in the middle and at the edges of the screen it is necessary to introduce in the saw-tooth function an appropriate correction capable of reducing the slope of the ramp in the vicinity of the minimal and maximal values. This type of correction is commonly called "S correction".

A known type of ramp generator includes a direct current generator, a capacitance charged by the direct current generator, and a switch controlled by the vertical synchronism signal to periodically discharge said capacitance.

To perform the S correction of the scanning ramp thus produced the commonly used solution calls for employment of two distinct capacitances in series with usually the same value (0.1 u F), to the common terminals of which the voltage ramp taken at the generator output is brought back through a feedback circuit including an adjustable resistance. Another adjustable resistance is placed in parallel with the two capacitances. The two adjustable resistances cause distortions with opposite signs which combine in such a manner as to produce a symmetrically distorted output ramp with a substantially S-shaped development, increasing in a straight line at the centre, more slowly at the two minimum and maximum ends.

This type of correction has the drawback of being complicated to adjust and not compatible with automatic adjustment systems based on the use of control voltages.

SUMMARY OF THE INVENTION

The object of the present invention is to provide a circuit for correction of the vertical scanning ramp which could be simply and effectively adjusted by the application of a control voltage.

In accordance with the invention this object is achieved by an electronic circuit to be associated with a ramp generator. The ramp generator comprises a direct current generator, a capacitance charged by said current generator, a switch for periodic discharge of said capacitance, and an adjustable resistance for adjusting amplitude of the generated ramp. The electronic circuit according to the invention comprises a voltage-regulated variable-gain rectifier-amplifier circuit and a feedback circuit which brings back to said resistance an alternating current of amplitude and wave shape dependent upon the output voltage of said variable-gain rectifier-amplifier circuit.

By using the electronic circuit in accordance with the invention there is obtained the important result of adjusting the shape of the scanning ramp, which secures the desired S correction, by mere application of a control voltage to the control circuit of the variable-gain rectifier-amplifier circuit. A current with a triangular wave form is thus generated which in the ramp generator is superimposed on the direct current produced by the direct current generator to give rise to a saw-tooth output function the amplitude of which is set by the adjustable resistance and the linearity of which undergoes an S correction dependent upon the control voltage applied to the linearity control terminal of the variable-gain rectifier-amplifier circuit.

Preferably but not necessarily the feedback circuit includes a capacitance for cancelling out the voltage offset, i.e. the deviation of the average feedback waveform value from an appropriately set reference value, which would otherwise be introduced by the rectifier-amplifier circuit, causing variations in the amplitude of the saw-tooth function. The presence of said capacitance obviates the necessity of making the rectifier-amplifier circuitry complicated.

BRIEF DESCRIPTION OF THE DRAWINGS

The characteristics of the present invention will be made clearer by the detailed description given below of some practical embodiments thereof illustrated as non-limiting examples in the annexed drawings in which.

DETAILED DESCRIPTION OF THE PREFERRED EMBODIMENT

Figure 1:
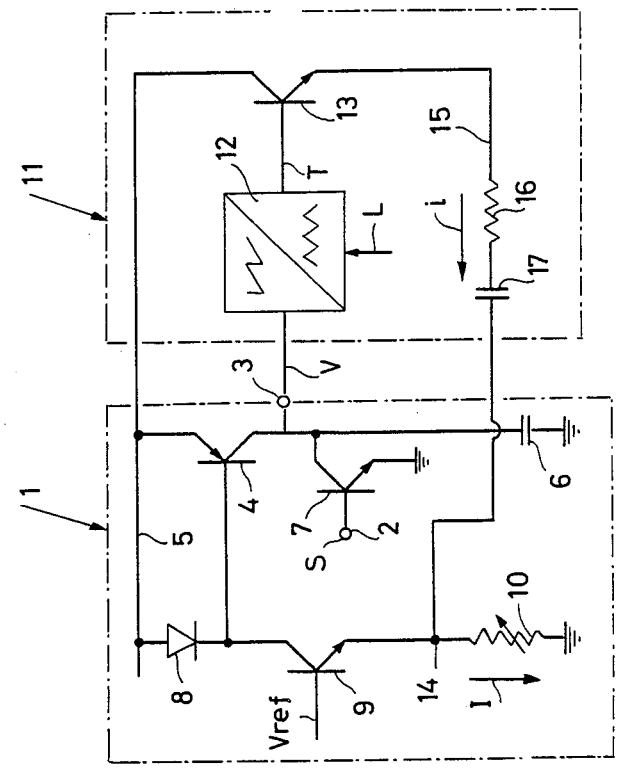
FIG. 1 shows the circuit diagram of a ramp generator with which is associated an electronic circuit for linearity correction in accordance with the present invention.

With reference to FIG. 1 the number 1 indicates a ramp generator which under the control of a vertical synchronism signal S applied to a control terminal 2 generates a saw-tooth voltage output V available at an output terminal 3. The ramp generator comprises essentially a direct current generator 4 consisting of a PNP transistor inserted between a positive supply lead 5 and an output terminal 3, a capacitance 6 inserted between the ouput terminal 3 and earth, and an NPN transistor 7 placed between the control terminal 2 and an intermediate point between the transistor 4 and the capacitance 6. Also included is the series of an adjustable resistance 10, an NPN transistor 9, and a diode 8 with cathode connected to the base of the transistor 4 to form a mirrorimage structure. A reference voltage Vref is applied to the base of the transistor 9.

With the ramp generator 1 is associated a linearity correction electronic circuit 11 which includes a variable-gain rectifier-amplifier circuit 12 adjusted by linearity control voltage L. The circuit 12 has its input connected to the output terminal 3 of the ramp generator 1 and its output connected to the base of an NPN transistor 13 which has its collector connected to the positive supply 5 and its emitter connected to a node 14 intermediate between the transistor 9 and the resistance 10 of the ramp generator 1 by a feedback circuit 15 which includes a resistance 16 and a capacitance 17.

In operation, the capacitance 6 of the ramp generator 1 is periodically charged by the current generator 4 and discharged by the transistor 7 under the control of and with the frequency of the synchronism signal S, thus making available to the ouput terminal 3 a saw-tooth voltage V of which the amplitude is determined by the leg in parallel 8, 9, 10 and is thus set by the adjustable resistance 10, which carries a direct current I. Development of the saw-tooth voltage V in the absence of linearity adjustment is illustrated in line (a) of FIG. 2.

In the presence of the correction circuit 11 the variable-gain rectifier-amplifier circuit 12 converts the saw-tooth voltage V to a voltage with triangular wave form of equal period T the amplitude of which is fixed in an adjustable manner by the control voltage L. The development of the triangular voltage 6, considered with the feedback leg 15 open, is illustrated in line (b) of FIG. 2.

Figure 2:
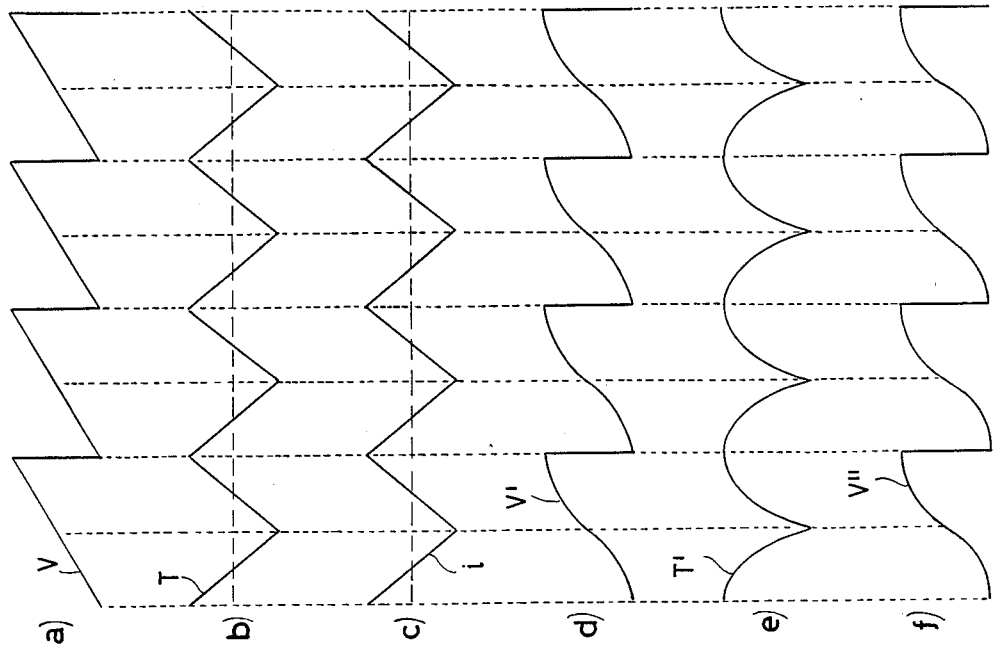
FIG. 2 shows a group of charts representing the wave forms present at various points of the circuit of FIG. 1.

The transistor 13 transfers the voltage T into the feedback circuit 15 where the resistance 16 converts it into a corresponding alternating current with a triangular wave form i (of the same sign as the voltage (T) the development of which is illustrated in line (c) of FIG. 2.

The alternating current is feb back to the ramp generator 1 where it is added algebraically (with positive sign in the middle negative at the ends of the original ramp) to the direct current I of the circuit node 14, thus causing through the transistor 4 a distortion of the linear saw-tooth shape of the voltage V. The result is a saw-tooth voltage V' having S correction the development of which is illustrated in line (d) of FIG. 2.

The corrected voltage V' is in turn rectified into triangular shape by the rectifier-amplifier circuit 12, i.e. is converted into the nonlinear triangular wave form voltage T' the development of which is illustrated in line (e) of FIG. 2.

Through transistor 13 the voltage T' originates a corresponding nonlinear triangular wave-form i' which once fed back to the ramp generator 1 causes another variation of the previously introduced distorsion. The final result is the wave form V''' illustrated in line (f) of FIG. 2.

It is clear that the magnitude of the correction made depends on the gain of the rectifieramplifier circuit 12, i.e. on the control voltage L. The correction circuit 11, as it is coupled with the ramp generator 1, thus lends itself very well to use in automatic correction systems acting on the voltage L. At the same time the amplitude of the ramp voltage does not change because it is set by the adjustable resistance 10 into which is injected a correction current with a zero average component.

Although not essential, the capacitance 17 is quite useful for cancelling out the offset otherwise introduced by the rectifier-amplifier circuit 12. Without further complications coincidence of the mean value of the triangular wave-form voltage T' (Vref less the base-emitter voltage of the transistor (9) is assured.

Figure 3:
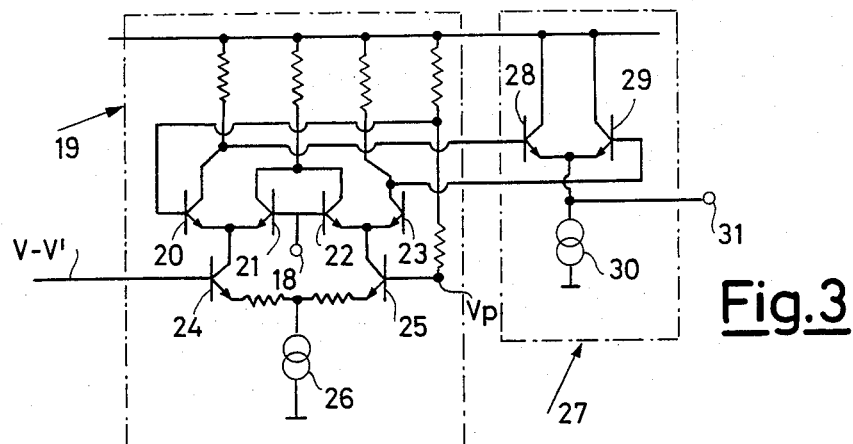
FIG. 3 shows an example of a practical embodiment of the linearity correction electronic circuit in accordance with the present invention.

A possible embodiment of the correction circuit 11 is illustrated in detail in FIG. 3 wherein to adjust linearity bymeans of voltage L there is indicated a control terminal 18 associated with a variable gain differential amplifier 19 made up of two pairs of opposed transistors 20, 21 and 22, 23 which are controlled by another pair of opposed transistor 24, 25 which have their common emitters connected to earth through a current generator 26 and their respective bases supplied with the saw-tooth voltage V—V' and with a polarization voltage Vp. With the amplifier 19 is combined with a rectifier 27, also differential, made up of a pair of opposed transistors 28, 29 the common emitters of which are connected to earth through a current generator 30 and constitute the terminal 31 from which may be taken the feedback voltage T.

Figure 4:
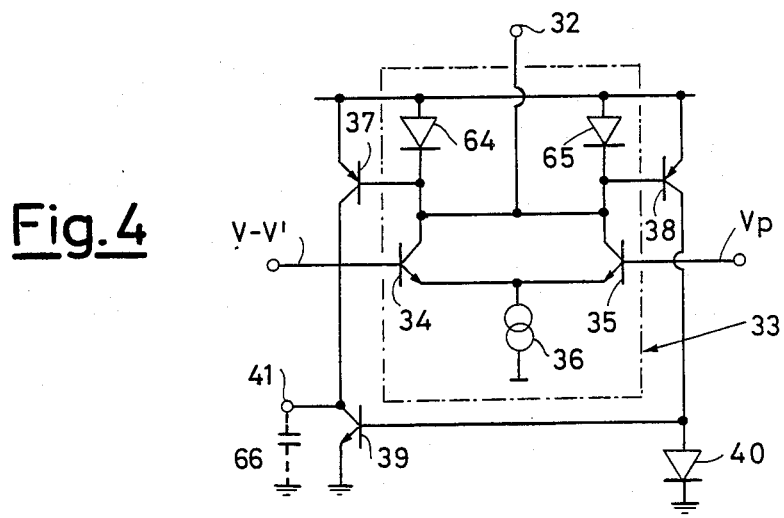
FIG. 4 shows another example of a practical embodiment of said linearity correction electronic circuit.

Another possible embodiment of the correction circuit 11 is illustrated in detail in FIG. 4 and, for adjustment of linearity, calls for a control terminal 32 associated with a variable-gain transconductance differential amplifier 33 made up of a pair of opposed transistors 34, 35 having their emitters connected to earth through a current generator 36. The base of the transistor 34 is supplied with the saw-tooth voltage V—V' while the base of the transistor 35 is supplied with a polarization voltage Vp. The control terminal 32 is connected to the collectors of the twotransistors in the case of FIG. 4 by a system of three current mirrors with transistors 37, 38 and 39 with their respective diodes 64, 65 and 40 having an output terminal 41 with which is associated externally a capacitance 66 on which is made available a parabolic wave form usable for the S correction. This solution has one more terminal than FIG. 3 but allows a more gradual S correction.

Figure 5:
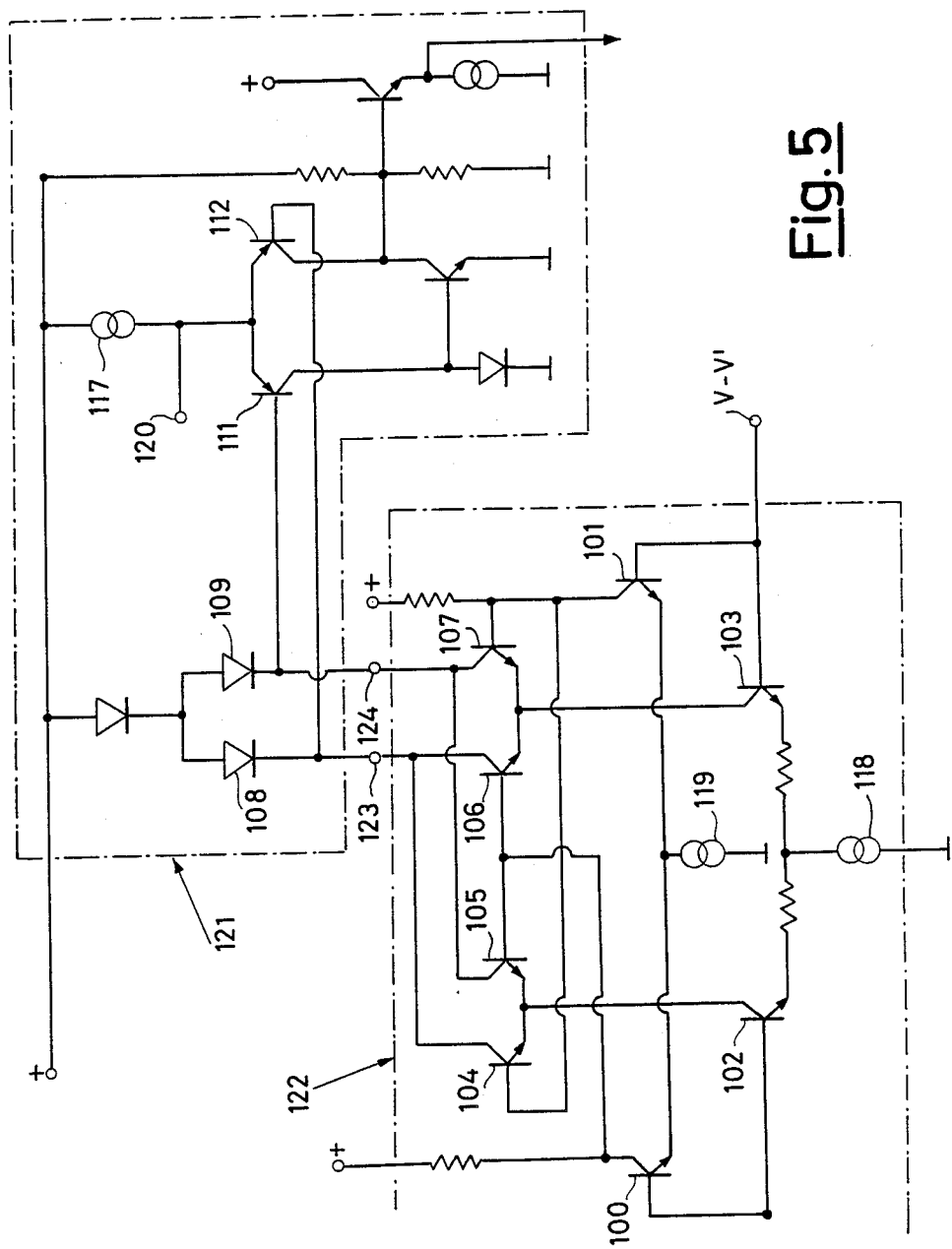
FIG. 5 shows another example of a practical embodiment of said electronic circuit.

In the embodiment illustrated in FIG. 5 the correction circuit 11 has a control terminal 120 associated with a variable gain amplifier 121 which is made up basically of the opposed transistors 111 and 112, a current generator 117, and the diodes 108, 109.

The rectifier, which is indicated by number 122, is made up basically of four pairs of opposed transistors 104 and 105, 106 and 107, 100 and 101, 102 and 103, of current generator 119 and 118, and of output terminals 123 and 124.

The transistor pair 102 and 103 converts the voltage V—V' into current which supplies the pairs 104, 105 and 106, 107. The pair 100, 101 functions as a switch and enables in the first half-period of V—V' the transistors 104 and 107 and in the second half-period the transistors 105 and 106.

Figure 6:
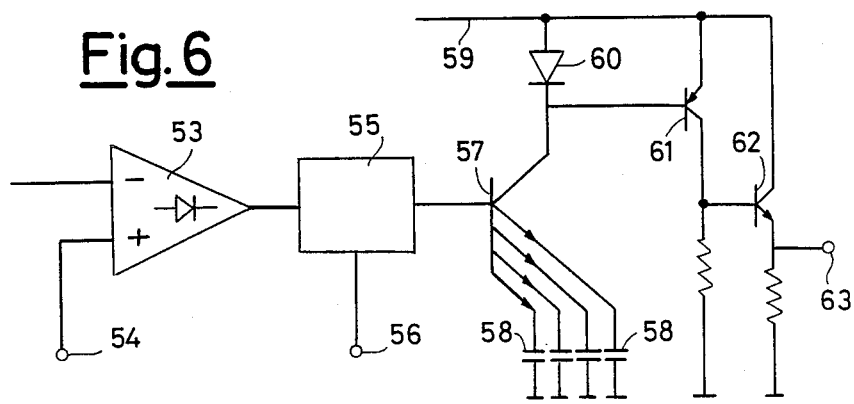
FIG. 6 shows another example of a practical embodiment of said electronic circuit.

For the two functions of amplification and rectification, the embodiment shown in FIG. 6 provides a differential amplifier 53 provided with a symmetry control terminal 54, a linearity regulator 55 with linearity control terminal 56, and an internal parabola generator made up of a multiemitter transistor 57 which has its emitters polarized at various reference voltages by means of voltage generators 58 and its collector connected to the positive supply 59 by means of a diode 60. Two transistors 61 and 62 take the output voltage from the collector of the transistor 57, making it available on an output terminal 63. The circuitry of FIG. 6 has clearly one more terminal than the solution given in FIG. 3 but allows symmetry regulation of the ouput wave form.

We claim:

1. An electronic circuit for S correcting the output of a ramp generator for use as a vertical scanning ramp in a television apparatus, said ramp generator comprising a direct current generator, a capacitance charged by said current generator, a switch for periodic discharge of said capacitance and an adjustable resistance for adjustment of the amplitude of the generated ramp, said electronic circuit comprising:
   a variable gain rectifier-amplifier circuit with regulated voltage which receives the output of said ramp generator, and
   a feedback circuit which feeds back to the ramp generator an alternating current signal the amplitude and wave-form of which is dependent upon the output voltage of said variable-gain rectifier-amplifier circuit.

2. A circuit in accordance with claim 1 wherein said feedback circuit comprises a capacitor for cancelling out any deviations from the mean value of said alternating current signal when compared with a reference value.

3. A circuit in accordance with claim 1 wherein said variable gain rectifier-amplifier circuit comprises a variable gain differential amplifier having a linearity control input terminal and a differential rectifier.

4. A circuit in accordance with claim 1 wherein said variable gain rectifier amplifier comprises a transconductance differential amplifier circuit which generates a parabolic signal on an external capacitance, said parabolic signal being input to said feedback circuit.

5. A circuit in accordance with claim 1 wherein said variable gain rectifier-amplifier circuit comprises a differential rectifier-amplifier, a linearity regulator having a linearity control terminal, and a parabola generator.

6. A circuit in accordance with claim 5 wherein said parabola generator comprises a multiemitter transistor.

* * * * *